P. S. MOYER.
RECRISPING MEANS.
APPLICATION FILED JUNE 26, 1919.
1,425,790.
Patented Aug. 15, 1922.
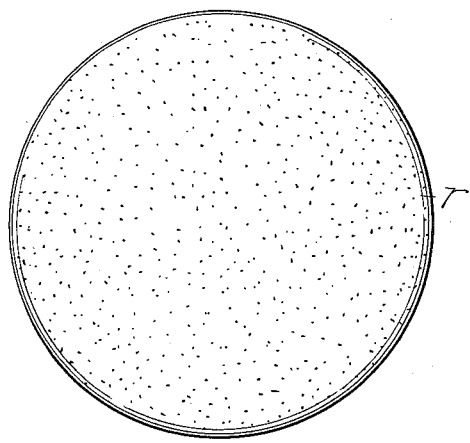
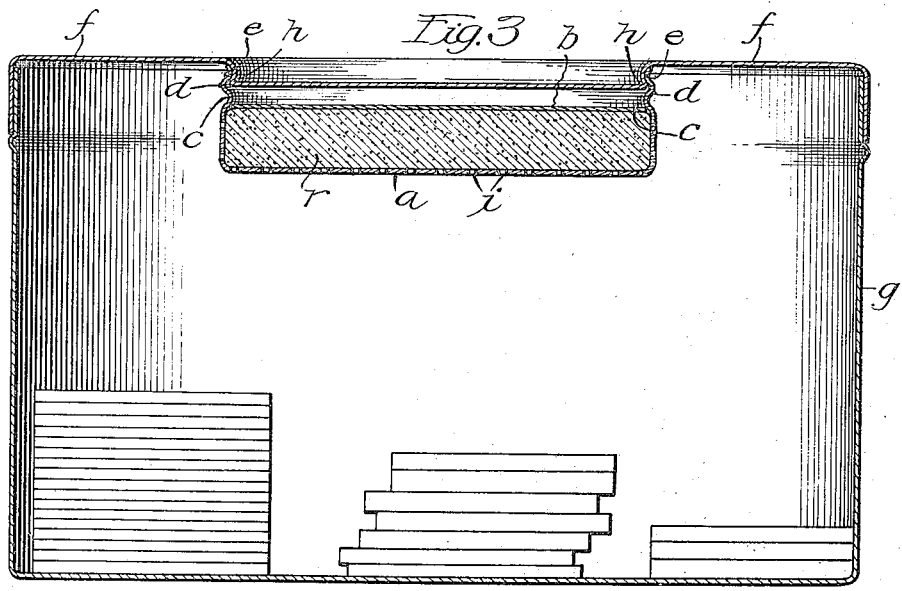
Inventor:
Paul S. Moyer,
By Schmidt & Hanson
Attys.

UNITED STATES PATENT OFFICE.

PAUL S. MOYER, OF CHICAGO, ILLINOIS, ASSIGNOR TO THE ARIDOR COMPANY, OF CHICAGO, ILLINOIS, A CORPORATION OF ILLINOIS.

RECRISPING MEANS.

1,425,790.           Specification of Letters Patent.     Patented Aug. 15, 1922.

Application filed June 26, 1919. Serial No. 306,803.

*To all whom it may concern:*

Be it known that I, PAUL S. MOYER, a citizen of the United States, and a resident of Chicago, in the county of Cook, State of Illinois, have invented certain new and useful Improvements in Recrisping Means, of which the following is a specification.

My invention relates to recrisping means, that is, means to be used in connection with prepared cereals, cereal products, crackers, cookies, wafers, and other bakery products to preserve or restore their crispness.

Products like the above, when exposed to the atmosphere, tend to take on moisture which soon destroys their crispness and makes them unpalatable. In my Patent No. 1,222,656 dated April 17, 1917, I disclose an invention in accordance with which a pad of fibrous material is impregnated or charged with some hygroscopic material such as calcium chlorid, the pads being then inserted in the containers of the food products to be protected. This is not always the most practical way of utilizing the hygroscopic material, and the object of my present invention therefore is to put hygroscopic material in more practical and commercial form. In accordance with my invention I preferably use a body of material such as infusorial earth with which the hygroscopic material such as calcium chlorid can be intimately mixed and which body material is also capable of holding considerable moisture which is attracted and taken on by the hygroscopic material and received by the body material. The body material and the hygroscopic material are intimately mixed together in the proper proportion and sufficient moisture then added to make a paste, which paste can be readily moulded into desired forms as for example bricks, cakes, wafers, tablets or sheets. After such molding the moulded products are subjected to a baking process which more intimately binds together the materials and thoroughly dries them. These bricks, cakes, wafers, or the like, can then be sold on the market to be inserted in the containers for the products to be preserved and protected. The bricks, cakes, wafers, etc., of recrisping material are sufficiently substantial to be readily handled and to retain their shapes. After they have taken on their full capacity of moisture they can be readily placed in an oven and heated until dry to be then again ready for service. To strengthen the recrisping product binder material may be added to the ingredients while they are being mixed. Preferably heat proof material such as asbestos is used which will stand the redrying heat to which the bricks, cakes, etc., are subjected after a period of use.

On the accompanying drawing, which forms a part of this specification,

Fig. 1 is a plan view of a recrisping cake,

Fig. 2 is a side view thereof, and

Fig. 3 is a vertical cross sectional view of a container showing a recrisping device detachably supported from the cover thereof.

The ingredients comprising the body material, and the hygroscopic material, preferably in comminuted or powder form, are thoroughly mixed either in the dry or moist state to a moldable consistency. If desired suitable binding material preferably of a fibrous nature may be added and thoroughly mixed with the ingredients. The mixed material in paste or semi-fluid form can now be molded in suitable molds to the desired form, and the molded products are then subjected to a baking process to be thoroughly dried and the ingredients more intimately secured together. These bricks, cakes, wafers, or the like, are of sufficient strength to retain their forms and they can be suitably wrapped for the market. When put to use, they are placed inside of the containers of the goods to be preserved and protected. Before placing them in the containers, they may be subjected to sufficient heat to assure thorough dryness thereof, and after a period of use within a container they can be taken out and again dried to remove any accumulated moisture. In the recrisping unit the hygroscopic material such as calcium chlorid will act as the attracting agent for drawing moisture out of the air within a container, and the body, such as infusorial earth, will receive the moisture from the hygroscopic material and will store it away to its full capacity. When this condition is reached the recrisping unit will be saturated to its capacity and will have to be removed and dried. The recrisping unit of my invention has a very large moisture containing capacity compared to its volume.

In Fig. 3 I have shown an improved arrangement for applying recrisping material in a container *g* for products to be protected against moisture. A shallow cylindrical box $a$ of sheet metal such as aluminum is provided for containing the recrisping material $r$. The material in the form of a previously formed cake may be placed in the box, or, the mixed ingredients in the form of a paste may be molded into the box and the box with the material placed in a suitable oven to bake out the material. After molding of the material a cover $b$ of sheet metal is applied, the cover being sprung into place below the internal annular bead $c$ formed in the box side. Above the head the box has the annular internal groove $d$, and above the groove the internal bead $e$. The cover $f$ for the receptacle $g$ has its central portion deflected downwardly to form the annular shoulder or ledge $h$ over which the bead $e$ of the box $a$ can be forced to bring the ledge and the groove $g$ into engagement. With this arrangement the recrisping material containing box can be detachably sprung on to the cover $f$. To provide access for the air within the receptacle $g$ to the material within the box $a$, the box walls have the perforations $i$.

The sheet metal box affords protection for the recrisping contents and after the material has become filled with moisture the box is placed in an oven and the material dried, after which the box can be again readily sprung on the ledge $h$ of the cover $f$. The boxes also serve as the packages in which the recrisping material is placed on the market, the directions for use being stamped or otherwise applied on the cover $d$ or on the body of the box.

Having described my invention, I claim as follows:

1. In combination, a container for food products and the like; a removable cover therefor; and moisture absorbing means carried by the interior of the cover comprising a holder or receptacle open to circulation of air in the container, and a moisture-absorbing medium, housed in said holder, and comprising the solid product of a mixture of infusorial earth and hygroscopic material intimately bound together and capable of attracting and absorbing moisture and of being readily dehydrated by heat.

2. In combination, a container for food products and the like; a closure therefor; and a body of dehydrating material attached to the interior side of said closure, said body comprising a solid composition of non-fibrous moisture absorbing material, hygroscopic material, and binding material, the whole being adapted to be readily dehydrated.

3. In combination, a container for food products and the like; a closure therefor; and a body of dehydrating material attached to the interior side of said closure, said body comprising a solid composition of infusorial earth, calcium chloride, and a binding material formed in a substantially solid cake susceptible of ready handling for attachment to and detachment from the closure and for being dehydrated.

4. In combination, a container for food products and the like; a removable cover therefor; and moisture absorbing means carried by the interior of the cover comprising a holder or receptacle open to circulation of air in the container and a moisture-absorbing substance housed and confined in said holder.

5. In combination, a container for food products and the like; a closure therefor; and a body of dehydrating material removably attached to the interior side of said closure, said body being adapted to be readily dehydrated by heat.

6. In combination, a container for food products and the like; a closure therefor; a holder open to air circulation attached to the interior side of said closure; said closure and holder having interengaging parts whereby the holder may be readily attached to and detached from said closure; and a moisture-absorbing substance housed and confined in said holder.

7. In combination, a container for food products and the like; a closure therefor; a holder open to air circulation removably attached to the interior side of said closure; said closure and holder being formed with interengaging parts whereby the holder may be sprung into attachment with said closure; and a moisture-absorbing substance housed and confined in said holder.

In witness whereof, I hereunto subscribe my name this 20th day of June A. D., 1919.

PAUL S. MOYER.

Certificate of Correction.

It is hereby certified that in Letters Patent No. 1,425,790, granted August 15, 1922, upon the application of Paul S. Moyer, of Chicago, Illinois, for an improvement in "Recrisping Means," errors appear in the printed specification requiring correction as follows: Page 2, line 12, for the word "head" read *bead*, and line 78, claim 5, for the misspelled word "dehvdrating" read *dehydrating;* and that the said Letters Patent should be read with these corrections therein that the same may conform to the record of the case in the Patent Office.

Signed and sealed this 3d day of October, A. D., 1922.

[SEAL.]

WM. A. KINNAN,
*Assistant Commissioner of Patents.*